US008895131B2

(12) United States Patent
Tamura et al.

(10) Patent No.: US 8,895,131 B2
(45) Date of Patent: *Nov. 25, 2014

(54) HONEYCOMB STRUCTURE

(75) Inventors: Seiji Tamura, Ibi-gun (JP); Masaya Sato, Ibi-gun (JP); Shigeaki Goto, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 890 days.

This patent is subject to a terminal disclaimer.

(21) Appl. No.: 13/089,324

(22) Filed: Apr. 19, 2011

(65) Prior Publication Data

US 2011/0263413 A1    Oct. 27, 2011

(30) Foreign Application Priority Data

Apr. 22, 2010    (WO) .................. PCT/JP2010/057183

(51) Int. Cl.
| *B01D 46/24* | (2006.01) |
| *C04B 35/565* | (2006.01) |
| *C04B 38/00* | (2006.01) |
| *C04B 111/00* | (2006.01) |

(52) U.S. Cl.
CPC ........ B01D 46/2455 (2013.01); C04B 38/0009 (2013.01); *C04B 2111/0081* (2013.01); C04B 35/565 (2013.01); *C04B 38/0016* (2013.01); *C04B 2111/00793* (2013.01)
USPC ............................. 428/116; 502/439; 55/523

(58) Field of Classification Search
CPC .................................................. B01D 46/2455
USPC ......................................................... 428/116
See application file for complete search history.

(56) References Cited

U.S. PATENT DOCUMENTS

| 4,810,554 A * | 3/1989 | Hattori et al. ................. 428/116 |
| 8,685,885 B2 * | 4/2014 | Tamura et al. ................. 502/439 |
| 2004/0161596 A1 | 8/2004 | Taoka et al. |

(Continued)

FOREIGN PATENT DOCUMENTS

| EP | 1142619 | 10/2001 |
| EP | 1413345 | 4/2004 |

(Continued)

OTHER PUBLICATIONS

International Search Report for corresponding International Application No. PCT/JP2010/057183, Jul. 20, 2010.

(Continued)

*Primary Examiner* — David Sample
*Assistant Examiner* — Nicholas W Jordan
(74) *Attorney, Agent, or Firm* — Mori & Ward, LLP

(57) ABSTRACT

A honeycomb structure includes a ceramic block. A plurality of honeycomb fired bodies include first-shaped units, second-shaped units, and third-shaped units. The first-shaped units include peripheral first-shaped units. Each of the peripheral first-shaped units is disposed in such a manner as to have two sides. One side of the two sides faces one of adjacent sides of one third-shaped unit among the third-shaped units with an adhesive layer therebetween. Another side of the two sides faces one of adjacent sides of another third-shaped unit among the third-shaped units with the adhesive layer therebetween. The two sides of each of the peripheral first-shaped units or extensions of the two sides are each neither substantially parallel nor substantially perpendicular to an extension of a second side and an extension of a first side of each of the second-shaped units.

21 Claims, 10 Drawing Sheets

(56) References Cited

U.S. PATENT DOCUMENTS

| | | | |
|---|---|---|---|
| 2006/0019061 A1 | 1/2006 | Oshimi | |
| 2008/0160250 A1 | 7/2008 | Adler et al. | |
| 2008/0236394 A1* | 10/2008 | Ohno et al. | 264/630 |
| 2009/0239028 A1* | 9/2009 | Ohno et al. | 428/116 |

FOREIGN PATENT DOCUMENTS

| | | |
|---|---|---|
| EP | 1493479 | 1/2005 |
| EP | 1618941 | 1/2006 |
| EP | 1741891 | 1/2007 |
| EP | 1961930 | 8/2008 |
| EP | 1977810 | 10/2008 |
| EP | 2062636 | 5/2009 |
| EP | 2090414 | 8/2009 |
| EP | 2113643 | 11/2009 |
| JP | 59-519 | 1/1984 |
| JP | 62-56348 | 3/1987 |
| JP | 2003-201823 | 7/2003 |
| JP | 2003-275522 | 9/2003 |
| JP | 2004-154718 | 6/2004 |
| JP | 2008-179526 | 8/2008 |
| JP | 2009-255046 | 11/2009 |
| WO | WO 02/096827 | 12/2002 |
| WO | WO 2008/126335 | 10/2008 |
| WO | WO 2009/118811 | 10/2009 |

OTHER PUBLICATIONS

Extended European Search Report for corresponding EP Application No. 10193779.5-1213, Jul. 6, 2011.
International Search Report for corresponding International Application No. PCT/JP2010/057181, Jul. 20, 2010.
International Search Report for corresponding International Application No. PCT/JP2010/057184, Jul. 20, 2010.
Office Action with Form PTO-892 Notice of References Cited issued by the U.S. Patent and Trademark Office for the U.S. Appl. No. 13/081,501, Jun. 2, 2014.
Office Action with Form PTO-892 Notice of References Cited issued by the U.S. Patent and Trademark Office for the U.S. Appl. No. 13/090,262, Mar. 15, 2013.

* cited by examiner

A-A line cross-sectional view

HONEYCOMB STRUCTURE

CROSS-REFERENCE TO RELATED APPLICATIONS

The present application claims priority under 35 U.S.C. §119 to International Application No. PCT/JP2010/057183 filed on Apr. 22, 2010, the contents of which are incorporated herein by reference in their entirety.

BACKGROUND OF THE INVENTION

1. Field of the Invention

The present invention relates to a honeycomb structure.

2. Discussion of the Background

In recent years, particulate matters such as soot in exhaust gases that are discharged from internal combustion engines for vehicles such as a bus and a truck, construction equipment and the like, have raised problems as contaminants harmful to the environment and the human body. In order to solve those problems, there have been proposed various particulate filters in which a honeycomb structure made of porous ceramics is used as a filter capable of capturing PMs in exhaust gases to purify the exhaust gases.

As the honeycomb structure of this kind, for example, there is known a honeycomb structure including a plurality of pillar-shaped honeycomb fired bodies combined with one another with an adhesive layer interposed therebetween. Here, the honeycomb fired bodies are each manufactured by carrying out extrusion-molding, degreasing, firing or the like on a mixture including a ceramic raw material such as silicon carbide.

JP-A 2008-179526 discloses a method for manufacturing a honeycomb structure.

According to the manufacturing of the honeycomb structure in JP-A 2008-179526, a rectangular pillar-shaped ceramic block (honeycomb segment joined body) is prepared by combining a plurality of rectangular pillar-shaped honeycomb fired bodies (honeycomb segments) with one another with an adhesive layer interposed therebetween. Then, grinding is carried out in which the periphery of the ceramic block is ground to manufacture a ceramic block. Then, the peripheral face of this ceramic block is coated with a sealing material (coating material) to manufacture a honeycomb structure.

The contents of JP-A-2008-179526 are incorporated herein by reference in their entirety.

SUMMARY OF THE INVENTION

According to one aspect of the present invention, a honeycomb structure includes a ceramic block and a sealing material layer. The ceramic block includes a plurality of honeycomb fired bodies and an adhesive layer. The plurality of honeycomb fired bodies each have cell walls extending along a longitudinal direction of the plurality of honeycomb fired bodies to define cells. The plurality of honeycomb fired bodies include first-shaped units, second-shaped units, and third-shaped units. The first-shaped units each have a substantially quadrangular shape in a cross section perpendicular to the longitudinal direction. The second-shaped units each have a shape that includes at least a first side, a second side longer than the first side and making a substantially right angle with the first side, and an inclined side facing the substantially right angle in the cross section perpendicular to the longitudinal direction. Each of the second-shaped units is disposed in a peripheral portion of the ceramic block in such a manner that the inclined side is in contact with the sealing material layer. The third-shaped units each have a substantially right triangular shape with a hypotenuse and adjacent sides in the cross section perpendicular to the longitudinal direction. Each of the third-shaped units is disposed on an inner side of the second-shaped units in the ceramic block in such a manner that the hypotenuse faces the second side of one of the second-shaped units with the adhesive layer between the hypotenuse and the second side. The first-shaped units include peripheral first-shaped units. Each of the peripheral first-shaped units is disposed in such a manner as to have two sides. One side of the two sides faces one of the adjacent sides of one third-shaped unit among the third-shaped units with the adhesive layer between the one side of the two sides and the one of the adjacent sides. Another side of the two sides faces one of the adjacent sides of another third-shaped unit among the third-shaped units with the adhesive layer between the another side of the two sides and the one of the adjacent sides. The two sides of each of the peripheral first-shaped units or extensions of the two sides are each neither substantially parallel nor substantially perpendicular to an extension of the second side and an extension of the first side of each of the second-shaped units. The adhesive layer is interposed between the plurality of honeycomb fired bodies to combine the plurality of honeycomb fired bodies. The sealing material layer is provided on a peripheral face of the ceramic block.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
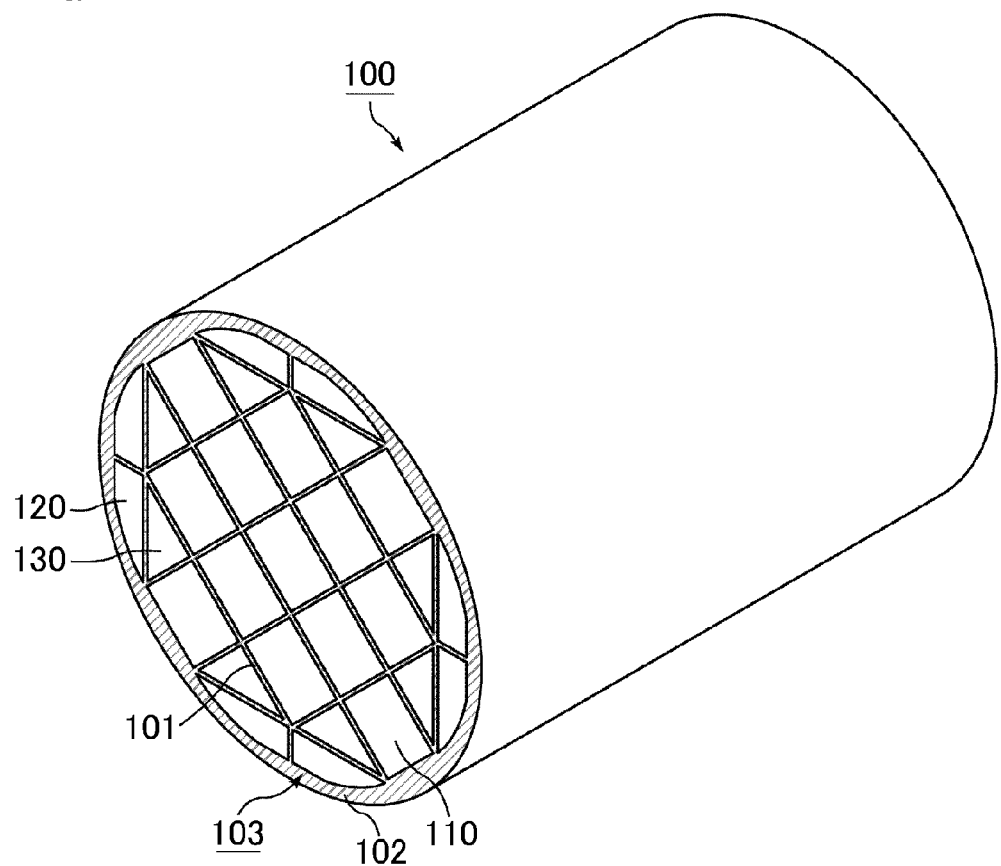
FIG. 1 is a perspective view schematically illustrating one example of a honeycomb structure of a first embodiment of the present invention.

The embodiments will now be described with reference to the accompanying drawings, wherein like reference numerals designate corresponding or identical elements throughout the various drawings.

In recent years, a honeycomb structure has been increasingly installed as a large particulate filter for purifying exhaust gases that are discharged from big cars such as a diesel truck, agricultural machines, construction machines, ships, locomotives, and the like.

As disclosed in JP-A 2008-179526, manufacturing of a honeycomb structure involves grinding the periphery of a ceramic block into a specific shape. In the case of manufacturing of a large filter, a ceramic part to be ground in grinding is in a large amount, and therefore, a lot of raw materials are wasted. Further, since ceramics such as silicon carbide has a high hardness, grinding for it requires a long time.

A honeycomb structure according to an embodiment of the present invention includes: a ceramic block formed by a plurality of honeycomb fired bodies combined with one another with an adhesive layer interposed therebetween, each of the honeycomb fired bodies having a large number of cells placed in parallel with one another in a longitudinal direction with a cell wall therebetween; and a sealing material layer formed on a peripheral face of the ceramic block, wherein the honeycomb fired bodies include first-shaped units, second-shaped units, and third-shaped units, each of the first-shaped units has a substantially quadrangular shape in a cross section perpendicular to the longitudinal direction, each of the second-shaped units has a shape that includes at least a first side, a second side longer than the first side and making a substantially right angle with the first side, and an inclined side facing the substantially right angle in the cross section perpendicular to the longitudinal direction, each of the third-shaped units has a substantially right triangular shape with a hypotenuse and adjacent sides in the cross section perpendicular to the longitudinal direction, each of the second-shaped units is disposed in a peripheral portion of the ceramic block in such a manner that the inclined side is in contact with the sealing material layer, each of the third-shaped units is disposed on the inner side of the second-shaped units in the ceramic block in such a manner that the hypotenuse faces the second side of any one of the second-shaped units with the adhesive layer therebetween, the first-shaped units include peripheral first-shaped units, each of the peripheral first-shaped units is disposed in such a manner as to have two sides, one side facing one of the adjacent sides of one third-shaped unit with the adhesive layer therebetween, the other side facing one of the adjacent sides of another third-shaped unit with the adhesive layer therebetween, and the two sides of each of the peripheral first-shaped units or extensions thereof are each neither substantially parallel nor substantially perpendicular to an extension of the second side and an extension of the first side of each of the second-shaped units.

Each of the second-shaped units has an inclined side that forms the periphery thereof in the cross section perpendicular to the longitudinal direction.

The inclined side is a side facing the substantially right angle made by the first and second sides, and is the longest side.

The inclined side may be a side formed by a substantially circular arc or a side formed by a straight line.

When the inclined side is a side formed by a substantially circular arc, a ceramic block with a shape similar to a substantially round pillar shape, a pillar shape with a substantially racetrack end face, a substantially cylindroid shape, or a pillar shape with a substantially triangular end face whose apexes have a curved shape tends to be manufactured by disposing the second-shaped units so that this inclined side formed by a substantially circular arc is located on the outermost peripheral side.

When the inclined side is a side formed by a straight line, the inclined side has a tilt close to that of a side equivalent to the hypotenuse of a substantially right triangle that includes a substantially right angle made by the first and second sides. Also by disposing the second-shaped units so that the inclined side formed by a straight line is located on the outermost peripheral side, a ceramic block with a shape similar to a substantially round pillar shape, a pillar shape with a substantially racetrack end face, a substantially cylindroid shape, or a pillar shape with a substantially triangular end face whose apexes have a curved shape tends to be manufactured.

Each of the third-shaped units has a hypotenuse and adjacent sides that form the periphery thereof in the cross section perpendicular to the longitudinal direction. The hypotenuse is the longest side and faces the substantially right angle formed by the adjacent sides.

Each of the third-shaped units is disposed on the inner side of the second-shaped units in the ceramic block in such a manner that the hypotenuse faces the second side of any one of the second-shaped units with the adhesive layer therebetween. Thus, a ceramic block with a shape more similar to a substantially round pillar shape, a pillar shape with a substantially racetrack end face, a substantially cylindroid shape, or a pillar shape with a substantially triangular end face whose apexes have a curved shape tends to be manufactured.

Each of the first-shaped units has four sides that form the periphery thereof in the cross section perpendicular to the longitudinal direction. The cross-sectional shape of each of the first-shaped units perpendicular to the longitudinal direction may be a substantially square or substantially rectangular shape provided that it is a substantially quadrangular shape.

The first-shaped units include peripheral first-shaped units. Each of the peripheral first-shaped units has two sides, one side facing one of the adjacent sides of one third-shaped unit with the adhesive layer therebetween, the other side facing one of the adjacent sides of another third-shaped unit with the adhesive layer therebetween. Further, these two sides of each of the peripheral first-shaped units or extensions thereof are each neither substantially parallel nor substantially perpendicular to an extension of the second side and an extension of the first side of each of the second-shaped units.

Therefore, a ceramic block with a shape more similar to a substantially round pillar shape, a pillar shape with a substantially racetrack end face, a substantially cylindroid shape, or a pillar shape with a substantially triangular end face whose apexes have a curved shape tends to be manufactured.

Further, by forming a sealing material layer on the peripheral face of the ceramic block, the shape of the honeycomb structure tends to be changed into a substantially round pillar shape, a pillar shape with a substantially racetrack end face, a substantially cylindroid shape, or a pillar shape with a substantially triangular end face whose apexes have a curved shape.

Specifically, the honeycomb structure including the first-shaped units, the second-shaped units, and the third-shaped units is suitable for being manufactured without grinding. In the manufacturing, no raw materials are wasted and no time for grinding is required. Thus, the honeycomb structure according to an embodiment of the present invention tends to solve the problems attributed to the grinding.

In the honeycomb structure according to the embodiment of the present invention, the peripheral first-shaped units desirably include outermost first-shaped units that are disposed in the peripheral portion of the ceramic block, each of the outermost first-shaped units desirably has a side that is in contact with the sealing material layer, and the sealing material layer desirably has a larger thickness in a portion that is in contact with each of the outermost first-shaped units than in a portion that is in contact with the inclined side of each of the second-shaped units.

When the sealing material layer in a portion that is in contact with each of the outermost first-shaped units has a large thickness, the strength of this portion tends to be increased, and this make it easier to increase strength of the entire sealing material layer.

In the honeycomb structure according to the embodiment of the present invention, the inclined side of each of the second-shaped units is desirably formed by a plurality of the cells disposed in a substantially stair-shaped fashion with the cell wall therebetween in the cross section perpendicular to the longitudinal direction.

In the honeycomb structure according to the embodiment of the present invention, the number of the honeycomb fired bodies is desirably 25 or more.

In the honeycomb structure according to the embodiment of the present invention, the honeycomb structure desirably has a substantially circular shape in the cross section perpendicular to the longitudinal direction and has a diameter of about 190 mm or more.

In the honeycomb structure according to the embodiment of the present invention, the large number of cells desirably have a substantially quadrangular shape in the cross section perpendicular to the longitudinal direction.

In the honeycomb structure according to the embodiment of the present invention, the large number of cells desirably include a large-capacity cell and a small-capacity cell.

In the honeycomb structure according to the embodiment of the present invention, the large-capacity cell and the small-capacity cell desirably have, in the cross section perpendicular to the longitudinal direction, a substantially quadrangular shape or a substantially quadrangular shape in which at least one portion equivalent to a corner of the quadrangle has a substantially circular-arc shape.

In the honeycomb structure according to the embodiment of the present invention, the large-capacity cell desirably has an substantially octagonal shape in the cross section perpendicular to the longitudinal direction, and the small-capacity cell desirably has, in the cross section perpendicular to the longitudinal direction, a substantially quadrangular shape or a substantially quadrangular shape in which at least one portion equivalent to a corner of the quadrangle has a substantially circular-arc shape.

In the honeycomb structure according to claim the embodiment of the present invention, the large-capacity cell and the small-capacity cell desirably have a cross section perpendicular to the longitudinal direction in which each side of the cells is formed by a curved line.

In the honeycomb structure according to the embodiment of the present invention, the large number of cells are desirably sealed at either one end thereof.

In the honeycomb structure according to the embodiment of the present invention, the honeycomb structure desirably has a substantially circular shape, a substantially racetrack shape, a substantially ellipsoidal shape, or a substantially triangular shape whose apexes have a curved shape in the cross section perpendicular to the longitudinal direction.

In the honeycomb structure according to the embodiment of the present invention, the ceramic block desirably has a shape similar to a substantially circular shape, a substantially racetrack shape, a substantially ellipsoidal shape, or a substantially triangular shape whose apexes have a curved shape in the cross section perpendicular to the longitudinal direction.

In the honeycomb structure according to the embodiment of the present invention, the two sides of each of the peripheral first-shaped units or extensions thereof each desirably make an angle of about 45° with the first side and the second side of each of the second-shaped units.

The present inventors manufactured, as the honeycomb fired bodies, units each of which has a substantially quadrangular shape in the cross section perpendicular to the longitudinal direction (hereinafter, a honeycomb fired body with such a shape is referred to as a first-shaped unit, also as a unit with a substantially quadrangular cross section).

The present inventors also manufactured, as the honeycomb fired bodies, units each of which has a shape that includes at least a first side, a second side longer than the first side and making a substantially right angle with the first side, and an inclined side facing the substantially right angle made by the first and second sides in the cross section perpendicular to the longitudinal direction (hereinafter, a honeycomb fired body with such a shape is referred to as a second-shaped unit, also as a unit with a substantially fan-shaped cross section or a unit with a substantially trapezoidal cross section).

The present inventors also manufactured, as the honeycomb fired bodies, units each of which has a substantially triangular shape with a hypotenuse and adjacent sides in the cross section perpendicular to the longitudinal direction (hereinafter, a honeycomb fired body with such a shape is referred to as a third-shaped unit, also as a unit with a substantially triangular cross section).

Upon manufacturing a ceramic block using the first-shaped units, the second-shaped units, and the third-shaped units together, the second-shaped units were disposed so as to be located in the peripheral portion of the ceramic block.

The third-shaped units were each disposed on the inner side of the second-shaped units in the ceramic block in such a manner that the hypotenuse faces the second side of any one of the second-shaped units with the adhesive layer therebetween.

Peripheral first-shaped units among the first-shaped units were each disposed in such a manner that each of the peripheral first-shaped units has two sides, one side facing one of the adjacent sides of one third-shaped units with the adhesive layer therebetween, the other side facing one of the adjacent sides of another third-shaped unit with the adhesive layer therebetween.

Further, each of the peripheral first-shaped units is disposed in such a way that the two sides or extensions thereof are each neither substantially parallel nor substantially perpendicular to an extension of the first side and an extension of the second side of each of the second-shaped units.

It is desirable that the two sides of each of the peripheral first-shaped units or extensions thereof each make an angle of about 45° with the first side and the second side of each of the second-shaped units.

According to one example of the combination of the respective units in accordance with this arrangement, each of the first-shaped units has a substantially square shape in the cross section perpendicular to the longitudinal direction; each of the second-shaped units has a substantially fan shape in the cross section perpendicular to the longitudinal direction; and each of the third-shaped units has a substantially isosceles right triangular shape in the cross section perpendicular to the longitudinal direction.

These respective units can be constructed as a pillar-shaped ceramic block as follows, for example. First, 9 pieces of the first-shaped units are disposed to form a substantially square shape, and the first-shaped units are further disposed on the left, right, top, and bottom sides of the square, thereby constructing a substantially cross-shaped aggregated body of the first-shaped units. Then, each of the third-shaped units is disposed in such a manner that its substantially right angle portion is fitted into a recessed portion of the aggregated body of the first-shaped units. Further, each of the second-shaped units is disposed in such a manner that the second side of the second-shaped unit faces the hypotenuse of the third-shaped unit.

Thus, by the simple arrangement, the first-shaped units, the second-shaped units, and the third-shaped units tend to be constructed as a ceramic block with a shape similar to a desired shape such as a substantially round pillar shape, a pillar shape with a substantially racetrack end face, a substantially cylindroid shape, or a pillar shape with a substantially triangular end face whose apexes have a curved shape.

By disposing the first-shaped units, the second-shaped units, and the third-shaped units in the above manner, a ceramic block with a shape similar to a substantially round pillar shape, a pillar shape with a substantially racetrack end face, a substantially cylindroid shape, or a pillar shape with a substantially triangular end face whose apexes have a curved shape is manufactured.

A sealing material layer is formed on the peripheral face of this ceramic block so that the honeycomb structure has a substantially round pillar shape, a pillar shape with a substantially racetrack end face, a substantially cylindroid shape, or a pillar shape with a substantially triangular end face whose apexes have a curved shape, and thereby the honeycomb structure tends to be manufactured without grinding.

Here, in the present description, "unit located in the peripheral portion of the ceramic block" means a unit (honeycomb fired body) that constitutes part of the peripheral face of the ceramic block.

Here, in the present description, the second-shaped unit whose inclined side is a substantially circular arc is referred to as a unit with a substantially fan-shaped cross section; whereas the second-shaped unit whose inclined side is a straight line is referred to as a unit with a substantially trapezoidal cross section.

The cross section of the honeycomb structure perpendicular to the longitudinal direction does not necessarily have a substantially circular shape, and may have a substantially racetrack shape, a substantially ellipsoidal shape, or a substantially triangular shape whose apexes have a curved shape, and the like. The cross section of the ceramic block also can be formed into a shape similar to a substantially racetrack shape, a substantially ellipsoidal shape, or a substantially triangular shape whose apexes have a curved shape, and the like by using the above-mentioned units in combination.

In addition, when the cross section of the ceramic block has a shape similar to a substantially racetrack shape, a substantially ellipsoidal shape, or a substantially triangular shape whose apexes have a curved shape, and the like, it means that the cross-sectional shape is approximate to each shape although having a projective portion or a recessed portion partly formed from the periphery.

Further, the curved line portion of a substantially triangular shape whose apexes have a curved line means a shape of a part of a substantially circular arc.

(First Embodiment)

The following description will discuss a first embodiment, which is one embodiment of the present invention, with reference to drawings.

FIG. 1 is a perspective view schematically illustrating one example of a honeycomb structure of a first embodiment of the present invention.

Figure 2A:
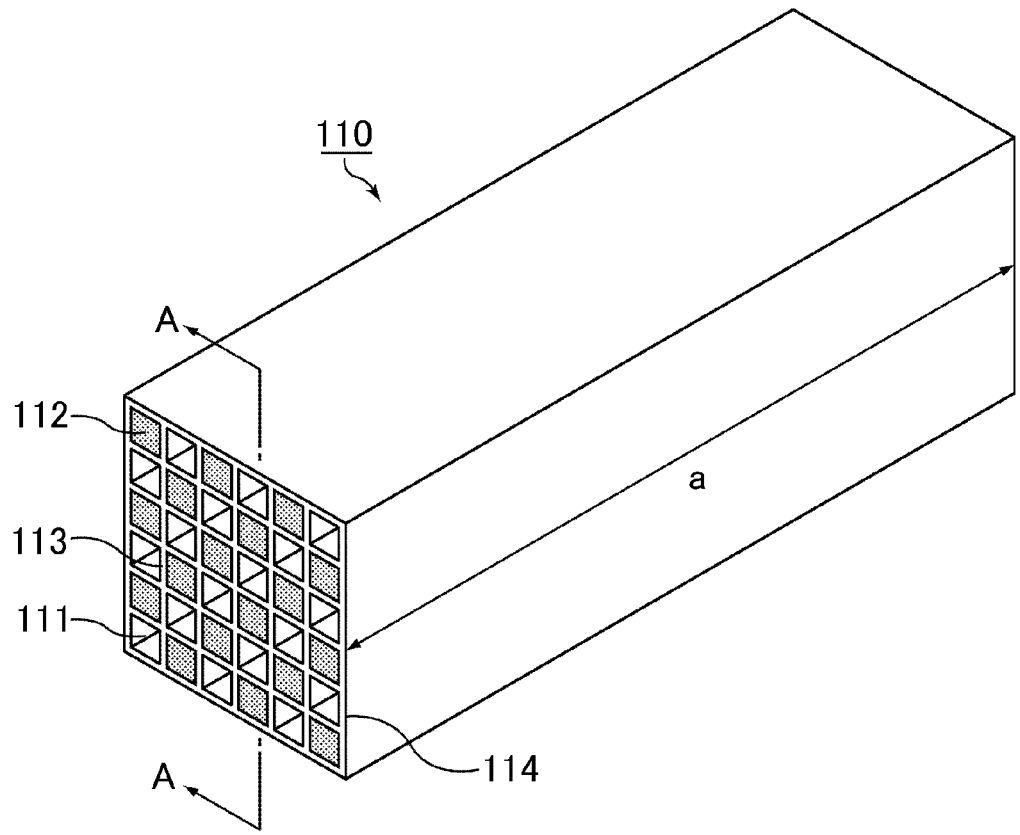
FIG. 2A is a perspective view schematically illustrating one example of a first-shape unit, which is one of the honeycomb fired bodies that configure the honeycomb structure of the first embodiment of the present invention.
Figure 2B:
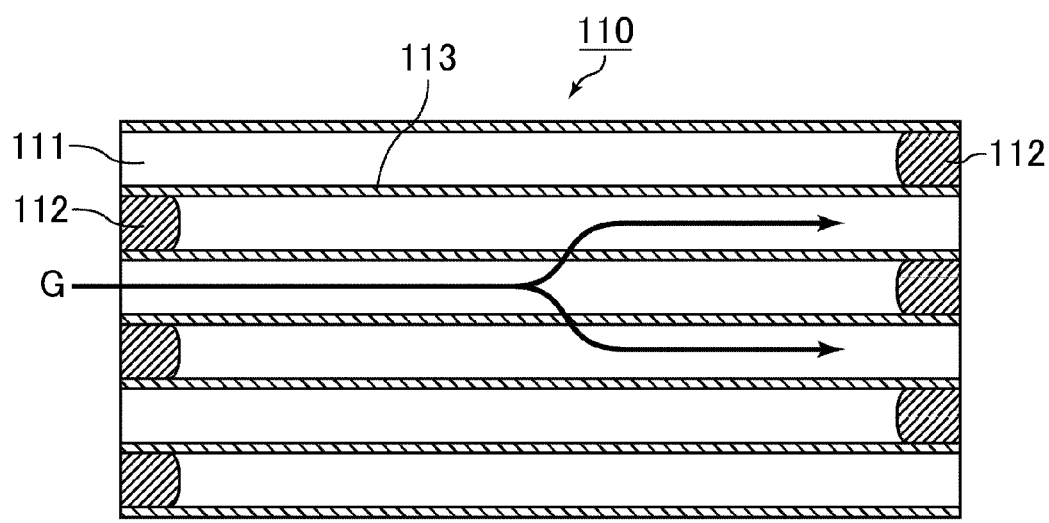
FIG. 2B is a cross-sectional view taken along line A-A in FIG. 2A.

FIG. 2A is a perspective view schematically illustrating one example of the first-shaped unit, which is one of the honeycomb fired bodies that configure the honeycomb structure of the first embodiment of the present invention. FIG. 2B is a cross-sectional view taken along line A-A in FIG. 2A.

Figure 3:
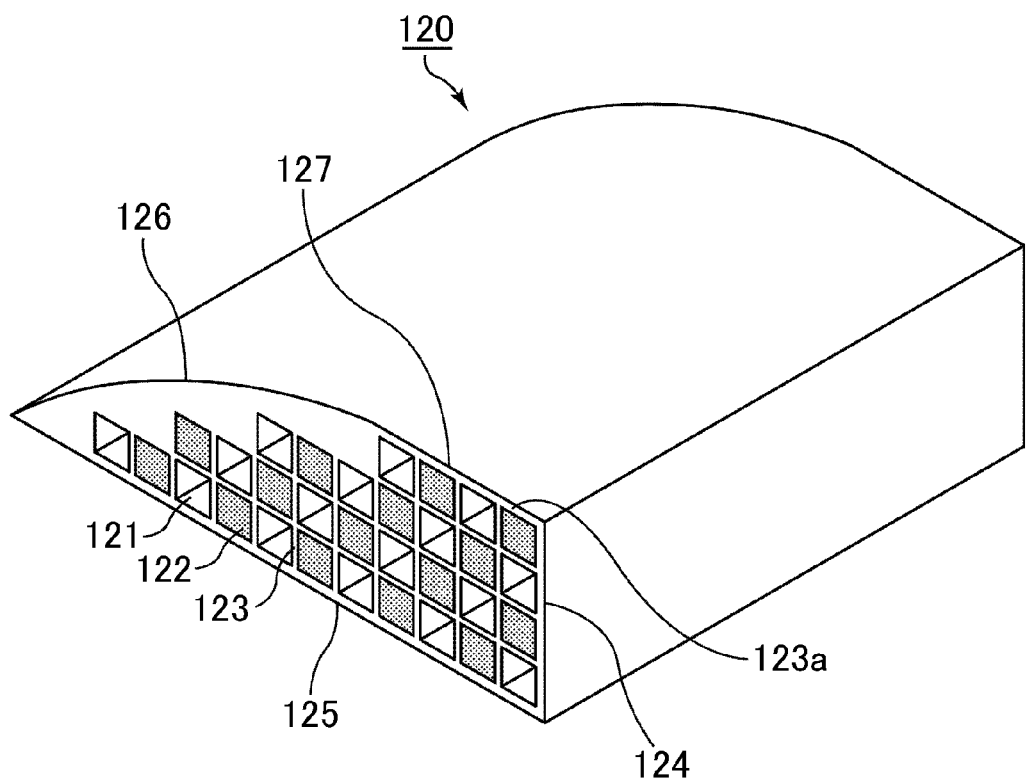
FIG. 3 is a perspective view schematically illustrating one example of a second-shaped unit, which is one of the honeycomb fired bodies that configure the honeycomb structure of the first embodiment of the present invention.

FIG. 3 is a perspective view schematically illustrating one example of the second-shaped unit, which is one of the honeycomb fired bodies that configure the honeycomb structure of the first embodiment of the present invention.

Figure 4:
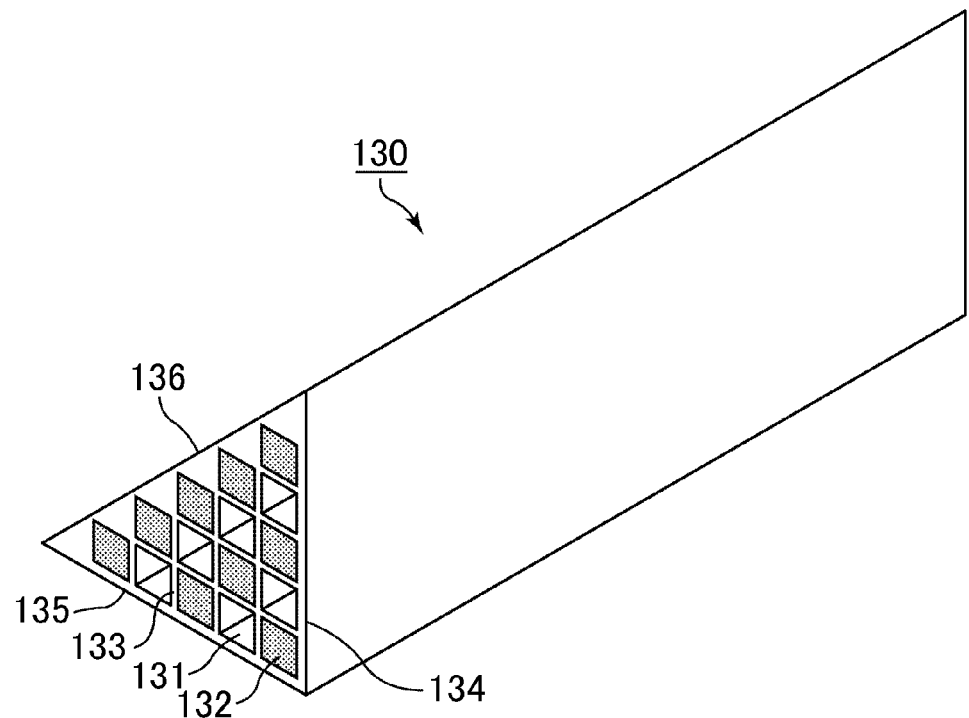
FIG. 4 is a perspective view schematically illustrating one example of a third-shaped unit, which is one of the honeycomb fired bodies that configure the honeycomb structure of the first embodiment of the present invention.

FIG. 4 is a perspective view schematically illustrating one example of the third-shaped unit, which is one of the honeycomb fired bodies that configure the honeycomb structure of the first embodiment of the present invention.

In a honeycomb structure 100 according to an embodiment of the present invention illustrated in FIG. 1, a plurality of porous silicon carbide honeycomb fired bodies 110 (first-shaped units 110) with a shape illustrated in FIG. 2A and FIG. 2B, a plurality of porous silicon carbide honeycomb fired bodies 120 (second-shaped units 120) with a shape illustrated in FIG. 3, and a plurality of porous silicon carbide honeycomb fired bodies 130 (third-shaped units 130) with a shape illustrated in FIG. 4 are combined with one another with a sealing material layer (adhesive layer) 101 interposed therebetween to configure a ceramic block 103. Further, a sealing material layer (coat layer) 102 is formed on the periphery of this ceramic block 103.

In the first-shaped unit 110 illustrated in FIG. 2A and FIG. 2B, a large number of cells 111 are disposed in parallel with one another in a longitudinal direction (the direction shown by a double-headed arrow "a" in FIG. 2A) with a cell wall 113 interposed therebetween. The cells 111 are sealed with a plug 112 at either one end thereof, and therefore, an exhaust gas G that flows into one cell 111 whose end on one side is open never fails to pass through the cell wall 113 that separates the cells 111, and then is discharged from another cell 111 whose end on the other side is open.

Thus, the cell wall 113 functions as a filter for capturing particulate matters such as soot in exhaust gases (hereinafter, referred to as PMs).

The cross section of the first-shaped unit 110 perpendicular to the longitudinal direction has a substantially quadrangular shape, and the first-shaped unit 110 is a unit with a substantially quadrangular cross section.

Four sides 114 that form the periphery of the above-mentioned substantially quadrangular shape preferably have substantially the same length, and the first-shaped unit 110 is preferably a substantially square shape in the cross section perpendicular to the longitudinal direction.

Also in the second-shaped unit 120 illustrated in FIG. 3, a large number of cells 121, plugs 122, and cell walls 123 are provided as in the first-shaped unit 110. Accordingly, the second-shaped unit 120 functions as a filter for capturing PMs and the like.

Further, an outer wall 123a that is constituted by the cell wall is provided in the peripheral portion of the second-shaped unit 120.

The cross section of the second-shaped unit 120 perpendicular to the longitudinal direction has a first side 124, a second side 125, a third side 127, and an inclined side 126.

The first side 124 and the second side 125 make a substantially right angle with each other, and the inclined side 126 faces the substantially right angle. The inclined side 126 is a substantially circular arc.

Here, in the present description, the "facing the substantially right angle" means that the inclined side is a side other than the two sides that make the substantially right angle.

The third side 127 is a side that connects the inclined side 126 to the first side 124, and is substantially parallel to the second side 125.

Specifically, the second-shaped unit 120 is a unit with a substantially fan-shaped cross section composed of one substantially circular arc and three straight line portions.

Also in the third-shaped unit 130 illustrated in FIG. 4, a plurality of cells 131, plugs 132, and cell walls 133 are provided as in the first-shaped unit 110. Thus, the third-shaped unit 130 functions as a filter for capturing PMs and the like.

The cross section of the third-shaped unit 130 perpendicular to the longitudinal direction has a substantially triangular shape, so that the third-shaped unit 130 is a unit with a substantially triangular cross section.

Further, the cross section of the third-shaped unit 130 perpendicular to the longitudinal direction has a substantially isosceles right triangular shape that includes a substantially right angle made by a first side 134 and a second side 135, both of which are adjacent sides, and a hypotenuse 136 facing the substantially right angle.

Here, in the present description, the shape of the respective units and the shape of the cells are expressed as a substantially triangular shape, a substantially quadrangular shape, and the like, but those in the present description are not required to be a strict triangle, quadrangle, and the like formed only by completely straight lines, and may be shapes whose corner(s) (apex(es)) is chamfered with a straight or curved line and which can be almost identified with a triangle, a quadrangle, and the like. Further, in the present description, the terms "substantially right angle", "substantially parallel", "substantially isosceles right triangle", and the like do not mean mathematically strict shapes, and include shapes that can be almost identified with "right angle", "parallel", "isosceles right triangle", and the like.

Figure 5A:
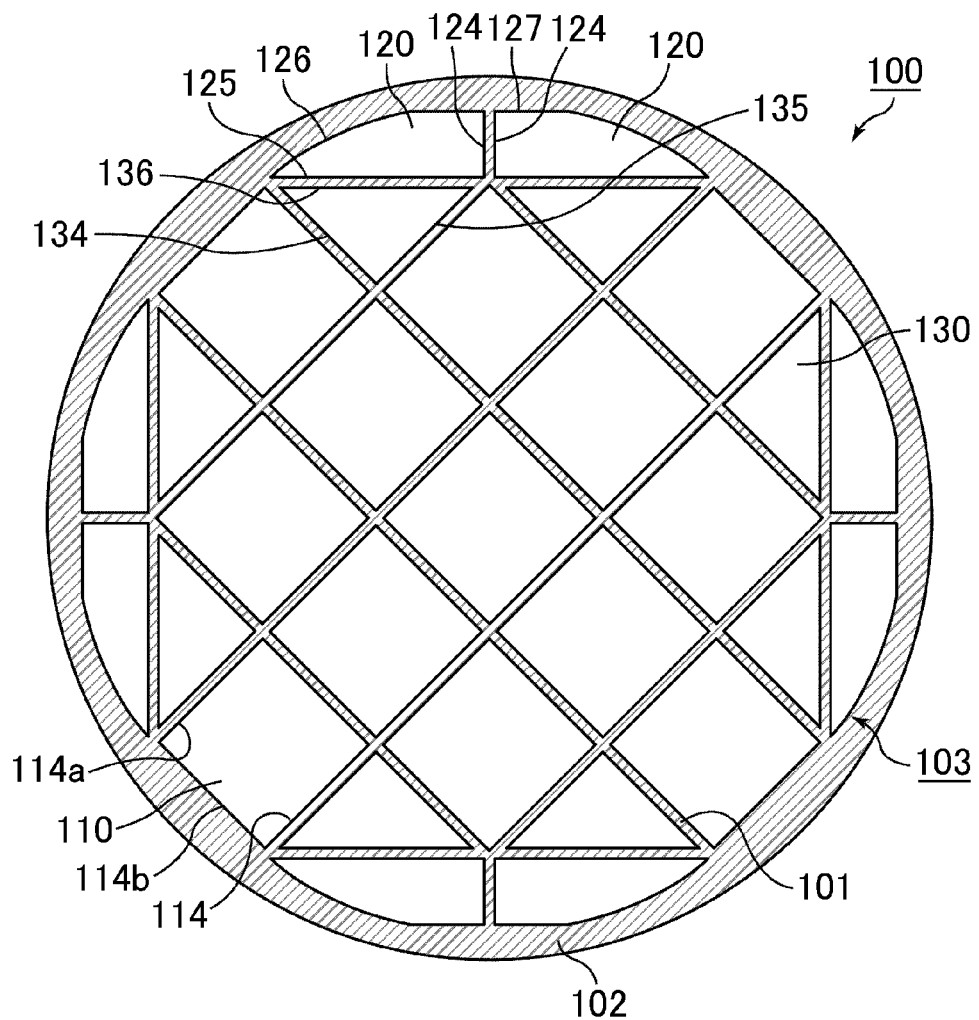
FIG. 5A is a side view of the honeycomb structure illustrated in FIG. 1.
Figure 5B:
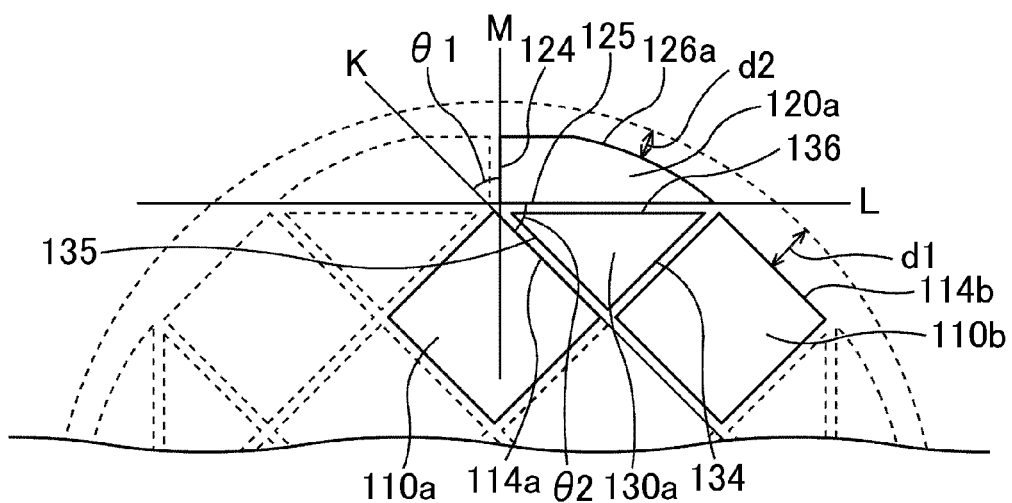
FIG. 5B is a side view illustrating one part of the honeycomb structure illustrated in FIG. 5A.

FIG. 5A is a side view of the honeycomb structure illustrated in FIG. 1. FIG. 5B is a side view illustrating one part of the honeycomb structure illustrated in FIG. 5A.

The following description will discuss an arrangement of the first-shaped units 110, the second-shaped units 120, and the third-shaped units 130 in the honeycomb structure 100, with reference to FIG. 5A and FIG. 5B.

As shown in FIG. 5A, in the honeycomb structure 100 according to the embodiment of the present invention, the second-shaped units 120 are disposed in the peripheral portion of the ceramic block 103 in such a manner that the inclined side 126 is in contact with the sealing material layer 102. Adjacent two second-shaped units 120 are disposed in such a manner that the first sides 124 face each other with the adhesive layer 101 therebetween. The number of the second-shaped units 120 is 8 pieces.

The third-shaped units 130 are disposed on the inner side of the second-shaped units 120 in the ceramic block 103. The hypotenuse 136 of each of the third-shaped units 130 is located facing the second side 125 of the second-shaped unit 120 with the adhesive layer 101 therebetween. The number of the third-shaped units 130 is 8 pieces.

Peripheral first-shaped units and outermost first-shaped units among the first-shaped units 110 are each disposed in such a manner that one side 114a faces an adjacent side 135 of the third-shaped unit 130 with the adhesive layer 101 therebetween. The number of the first-shaped units 110 is 13 pieces.

In FIG. 5B, for convenience of explanation, a peripheral first-shaped unit 110a, an outermost first-shaped unit 110b, a second-shaped unit 120a, and a third-shaped unit 130a are shown by a solid line, and others are shown by a broken line.

The straight line K is an extension of a side 114a of the peripheral first-shaped unit 110a. The straight line L is an extension of a second side 125 of the second-shaped unit 120a. The straight line M is an extension of a first side 124 of the second-shaped unit 120a.

Turning now to the peripheral first-shaped unit 110a, the four sides that form the peripheral first-shaped unit 110a and its extensions are all neither substantially parallel nor substantially perpendicular to the straight line L. Further, the four sides that form the peripheral first-shaped unit 110a and its extensions are neither substantially parallel nor substantially perpendicular to the straight line M.

The straight line K, which is an extension of the side 114a of the peripheral first-shaped unit 110a, makes an angle θ1 of about 45° with the straight line M, which is an extension of the first side 124 of the second-shaped unit 120a. Further, the straight line K, which is an extension of the side 114a of the peripheral first-shaped unit 110a, makes an angle θ2 of about 45° with the straight line L, which is an extension of the second side 125 of the second-shaped unit 120a.

According to this arrangement, the peripheral first-shaped unit 110a, the second-shaped unit 120a, and the third-shaped unit 130a whose shapes are different from one another can be combined into a shape more similar to a substantially round pillar shape, a pillar shape with a substantially racetrack end face, a substantially cylindroid shape, or a pillar shape with a substantially triangular end face whose apexes have a curved shape.

Referring to FIG. 5B, the outermost first-shaped unit 110b is included in the peripheral portion of the ceramic block 103. This outermost first-shaped unit 110b has a side 114b that is in contact with the sealing material layer 102.

The thickness d1 of the sealing material layer 102 in a portion that is in contact with the side 114b of the outermost first-shaped unit 110b is larger than the thickness d2 of the sealing material layer 102 in a portion that is in contact with the inclined side 126a of the second-shaped unit 120a. This configuration make it easier to increase the strength of the sealing material layer 102.

Although, in FIG. 5B, some of the units, i.e., the peripheral first-shaped unit 110a, the outermost first-shaped unit 110b, the second-shaped unit 120a, and the third-shaped unit 130a, are explained, substantially the same can be applied to the other units, i.e., the first-shaped units 110, the second-shaped units 120, and the third-shaped units 130 that configure the honeycomb structure 100.

The thickness d1 of the sealing material layer 102 is a thickness at the middle of the side 114 of the first-shaped unit 110 (at half the length of the side 114) in the direction perpendicular to the side 114. The thickness d2 of the sealing material layer 102 is a thickness at the middle of the inclined side 126 of the second-shaped unit 120 in the direction perpendicular to the inclined side 126.

In the honeycomb structure 100 according to the embodiment of the present invention, the total number of the honeycomb fired bodies is 29 pieces. Of the total, 13 pieces are the first-shaped units, 8 pieces are the second-shaped units, and 8 pieces are the third-shaped units.

Twenty-nine pieces of the honeycomb fired bodies are combined with one another with an adhesive layer 101 interposed therebetween to configure a ceramic block 103.

In addition, a sealing material layer 102 is formed on the peripheral face of the ceramic block 103, and thus, the cross section of the honeycomb structure 100 perpendicular to the longitudinal direction has a substantially circular shape.

Further, this honeycomb structure with a substantially circular cross section according to the embodiment of the present invention has a diameter of about 190 mm or more.

Here, when the cross section of the honeycomb structure perpendicular to the longitudinal direction has a substantially racetrack shape, a substantially ellipsoidal shape, or a substantially triangular shape whose apexes have a curved shape, it is desirable that the longest line segment of line segments each of which passes through the center of each shape and joints two points on the periphery has a length of about 190 mm or more.

Next, the following description will discuss a method for manufacturing the honeycomb structure of the present embodiment.

The method for manufacturing the honeycomb structure of the present embodiment is a method for manufacturing a honeycomb structure, including: molding a ceramic raw material to manufacture honeycomb molded bodies each including a large number of cells placed in parallel with one another in a longitudinal direction with a cell wall interposed therebetween; firing the honeycomb molded bodies to manufacture honeycomb fired bodies; combining a plurality of the honeycomb fired bodies with one another with an adhesive layer interposed therebetween to manufacture a ceramic block; and forming a sealing material layer on the peripheral face of the ceramic block, wherein in the molding and firing, at least first-shaped units, second-shaped units, and third-shaped units are manufactured, each of the first-shaped units has a substantially quadrangular shape in the cross section perpendicular to the longitudinal direction, each of the second-shaped units has a shape that includes at least a first side, a second side longer than the first side and making a substantially right angle with the first side, and an inclined side facing the substantially right angle in the cross section perpendicular to the longitudinal direction, each of the third-shaped units has a substantially right triangular shape with a hypotenuse and adjacent sides in the cross section perpendicular to the longitudinal direction, in the combining, each of the second-shaped units is disposed in a peripheral portion of the ceramic block in such a manner that the inclined side is in contact with the sealing material layer, each of the third-shaped units is disposed on the inner side of the second-shaped units in the ceramic block in such a manner that the hypotenuse faces the second side of any one of the second-shaped units with the adhesive layer therebetween, peripheral first-shaped units among the first-shaped units are each disposed in such a manner that each of the peripheral first-shaped units has two side, one side facing one of the adjacent sides of one third-shaped unit with the adhesive layer therebetween, the other side facing one of the adjacent sides of another third-shaped unit with the adhesive layer therebetween, and the two sides of each of the peripheral first-shaped units or extensions thereof are each neither substantially parallel nor substantially perpendicular to an extension of the second side and an extension of the first side of each of the second-shaped units.

According to the method for manufacturing the honeycomb structure of the present embodiment, in the combining, the first-shaped units are disposed in such a manner that: the peripheral first-shaped units include outermost first-shaped units that are disposed in the peripheral portion of the ceramic block;

each of the outermost first-shaped units has a side that is in contact with the sealing material layer; and the sealing material layer has a larger thickness in a portion that is in contact with each of the outermost first-shaped units than in a portion that is in contact with the inclined side of each of the second-shaped units.

The following description will discuss the method for manufacturing the honeycomb structure of the present embodiment in the order of the process.

Firstly, silicon carbide powders having different average particle diameters as a ceramic raw material are mixed with an organic binder, a liquid-state plasticizer, a lubricant, water, and the like to prepare a wet mixture for manufacturing molded bodies.

Successively, molding is carried out in which the wet mixture is extrusion-molded with an extrusion molding apparatus to manufacture honeycomb molded bodies with a specific shape.

In this case, the shape of the die is changed, and then manufactured are predetermined numbers of honeycomb molded bodies with a first shape that are to be the first-shaped units, honeycomb molded bodies with a second shape that are to be the second-shaped units, and honeycomb molded bodies with a third shape that are to be the third-shaped units.

In the following processes, the term "honeycomb molded bodies" is intended to refer to these three kinds of honeycomb molded bodies without distinguishing the three.

Next, cutting is carried out in which both ends of the honeycomb molded bodies are cut into a predetermined length with a cutting apparatus, and the cut honeycomb molded bodies are dried with a drying apparatus.

Successively, a plug material paste that is to be a plug in a specific amount is filled into the cells at either one end thereof to seal the cells. Through these processes, honeycomb molded bodies with the sealed cells are manufactured.

Here, the above-mentioned wet mixture can be used as the plug material paste.

Next, degreasing is carried out in which organic matters of the honeycomb molded bodies with the sealed cells are heated in a degreasing furnace. Thus, honeycomb degreased bodies are manufactured. These honeycomb degreased bodies have substantially the same shape as that of the respective honeycomb fired bodies illustrated in FIG. 2A, FIG. 3, and FIG. 4.

Then, the honeycomb degreased bodies are transported into a firing furnace, and then fired at about 2000° C. to about 2300° C. under argon atmosphere to manufacture honeycomb fired bodies having shapes illustrated in FIG. 2A, FIG. 3, and FIG. 4, i.e. first-shaped units, second-shaped units, and third-shaped units.

In the following processes, the term "honeycomb fired bodies" is intended to refer to these three kinds of honeycomb fired bodies without distinguishing the three.

Subsequently, combining is carried out in which an adhesive paste layer is formed between the honeycomb fired bodies, and then heated and solidified to form an adhesive layer, and thus the honeycomb fired bodies are combined with one another by interposing the adhesive layer therebetween to manufacture a ceramic block.

An adhesive paste containing inorganic fibers and/or a whisker, an inorganic particle, an inorganic binder, and an organic binder is suitably used as the adhesive paste.

In this combining, the second-shaped units are disposed in the peripheral portion, and the third-shaped units are disposed on the inner side of the second-shaped units, and then the first-shaped units are disposed adjacent to the third-shaped units. Thus, a ceramic block with a cross-sectional shape illustrated in FIG. 5A is manufactured.

Particularly, the second-shaped units are each disposed in the peripheral portion of the ceramic block in such a manner that the inclined side thereof is in contact with the sealing material layer and that the first sides 124 of two second-shaped units 120 are adjacent to each other.

Further, peripheral first-shaped units among the first-shaped units are each disposed in such a manner that: each of the peripheral first-shaped units has two sides, one side facing one of the adjacent sides of one third-shaped unit with the adhesive layer therebetween, the other side facing one of the adjacent sides of another third-shaped unit with the adhesive layer therebetween.

Each of the third-shaped units is disposed in such a manner that the hypotenuse faces the second side of the second-shaped unit with the adhesive layer therebetween.

Successively, forming sealing material layer is carried out in which a sealing material paste is applied to the peripheral face of the ceramic block, and the sealing material paste is dried and solidified to form a sealing material layer (coat layer). Thus, a substantially round pillar-shaped honeycomb structure is manufactured.

It is to be noted that substantially the same paste as the adhesive paste can be used as the sealing material paste forming the sealing material layer (coat layer). Through the above-mentioned processes, a honeycomb structure is manufactured.

The following will list the effects of the honeycomb structure of the present embodiment.

(1) In the honeycomb structure of the present embodiment, the inclined side of the second-shaped unit is disposed on the outermost periphery side, so that a ceramic block with a shape similar to a substantially round pillar shape, a pillar shape with a substantially racetrack end face, a substantially cylindroid shape, or a pillar shape with a substantially triangular end face whose apexes have a curved shape tends to be manufactured.

Such a honeycomb structure of the present embodiment is suitable for being manufactured without grinding. No raw materials are wasted in the manufacturing, and no time for grinding is required. Therefore, the problems attributed to grinding is easily to be solved.

(2) In the honeycomb structure of the present embodiment, the third-shaped units are each disposed on the inner side of the second-shaped units so that the hypotenuse that forms the periphery of the third-shaped unit faces the second side that forms the periphery of the second-shaped unit.

Therefore, a ceramic block with a shape more similar to a substantially round pillar shape, a pillar shape with a substantially racetrack end face, a substantially cylindroid shape, or a pillar shape with a substantially triangular end face whose apexes have a curved shape tend to be manufactured.

(3) In the honeycomb structure of the present embodiment, the two sides, each of which faces one of the adjacent sides of any one of the third-shaped units, of each of the peripheral first-shaped units or extensions thereof are each neither substantially parallel nor substantially perpendicular to an extension of the second side and an extension of the first side of each of the second-shaped units. Therefore, a ceramic block with a shape still more similar to a substantially round pillar shape, a pillar shape with a substantially racetrack end face, a substantially cylindroid shape, or a pillar shape with a substantially triangular end face whose apexes have a curved shape tends to be manufactured.

(4) In the honeycomb structure of the present embodiment, the peripheral first-shaped units include outermost first-shaped units that are disposed in the peripheral portion of the ceramic block, each of the outermost first-shaped units has a side that is in contact with the sealing material layer, and the sealing material layer has a larger thickness in a portion that is in contact with each of the outermost first-shaped units than in a portion that is in contact with the inclined side of each of the second-shaped units. Therefore, the strength of the sealing material layer tends to be increased.

EXAMPLES

The following description will discuss examples that more specifically disclose the first embodiment of the present invention, and the present invention is not intended to be limited only by Example.

Example 1

(Manufacture of First-Shaped Unit)

Extrusion molding was carried out in which a wet mixture including silicon carbide as a main component was extrusion-molded to provide first-shaped raw honeycomb molded bodies with cells unsealed, having the same shape as the shape illustrated in FIG. 2A.

Subsequently, the raw honeycomb molded bodies were dried to obtain dried honeycomb molded bodies. Then, the wet mixture as a plug material paste was injected into predetermined cells. The dried honeycomb molded bodies with the sealed cells were dried again with a drying apparatus.

Thereafter, degreasing and firing were carried out for the dried honeycomb molded bodies, thereby manufacturing honeycomb fired bodies made of a silicon carbide sintered body with a size of 34.3 mm×34.3 mm×150 mm, i.e. the first-shaped units, which has a rectangular pillar shape illustrated in FIG. 2A.

(Manufacture of Second-Shaped Unit)

Second-shaped units with a shape that is formed by three straight lines and one curved line, illustrated in FIG. 3 were manufactured by the same processes as in the manufacture of the first-shaped units, except that the shape of the die used in the molding was changed.

The manufactured second-shaped units each have a first side with a 18.6 mm length, a second side with a 48.1 mm length, and a third side with a 9.8 mm length, and an inclined side (curved line) with a 40.1 mm length. Further, the length in the longitudinal direction of the second-shaped unit is the same as that of the first-shaped unit.

(Manufacture of Third-Shaped Unit)

Third-shaped units with a triangular pillar shape illustrated in FIG. 4 were manufactured by the same processes as in the manufacture of the first-shaped units, except that the shape of the die used in the molding was changed.

The manufactured third-shaped units each have a first side with a 34.3 mm length, a second side with a 34.3 mm length, and a hypotenuse with a 48.3 mm length. Further, the length in the longitudinal direction of the third-shaped unit is the same as that of the first-shaped unit.

(Combining)

Successively, using a heat-resistant adhesive paste containing an alumina fiber and silicon carbide particles, a plurality of the honeycomb fired bodies were combined with one another by disposing the first-shaped units in the center part, and around them, the second-shaped units and the third-shaped units. Then, the adhesive paste was dried and solidified at 180° C. to form an adhesive layer, and thereby a ceramic block that has a cross-sectional shape that is formed by eight straight line portions and eight curved lines illustrated in FIG. 5 was manufactured.

The "straight line portion" used herein means a portion formed by the two third sides 127 of the two second-shaped units 120 and the adhesive layer interposed between the two units 120, or the side 114b of the outermost first-shaped unit 110b.

(Forming Sealing Material Layer)

Subsequently, the adhesive paste as a sealing material paste was applied to the peripheral face of the ceramic block. Then, the adhesive paste was dried and solidified at 120° C. to form a sealing material layer (coat layer) to manufacture a round pillar-shaped honeycomb structure.

The honeycomb structure manufactured in the present example was manufactured without grinding, and therefore no raw materials were wasted upon manufacturing the honeycomb structure.

The honeycomb structure has a circular cross-sectional shape and a diameter of 190.5 mm (7.5 inches φ). The proportion of the area occupied by the units (the honeycomb fired bodies), i.e. the occupancy of the honeycomb fired bodies, in the cross-sectional area was 88%.

(Other Embodiments)

In the first embodiment of the present invention, a unit with a substantially fan-shaped cross section or a unit with a substantially trapezoidal cross section may be employed as the second-shaped units.

FIG. 6A, FIG. 6B, FIG. 6C, FIG. 6D, and FIG. 6E are side views each schematically illustrating one example of the second-shaped unit of the honeycomb structure according to the embodiment of the present invention.

Figure 6A:
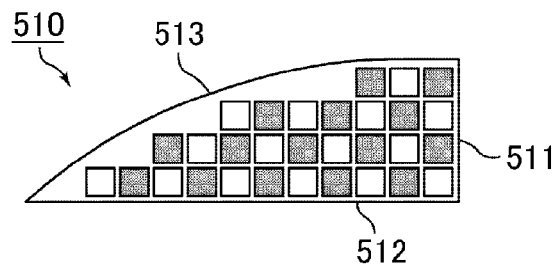
FIG. 6A, FIG. 6B, FIG. 6C, FIG. 6D, and FIG. 6E are side views each schematically illustrating one example of the second-shaped unit according to the honeycomb structure according to the embodiment of the present invention.
Figure 6B:
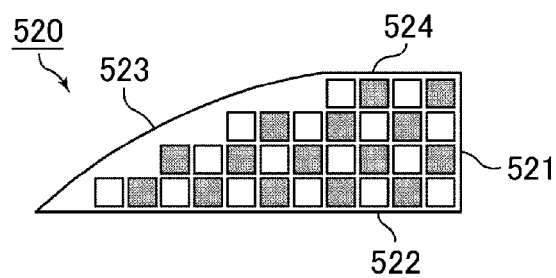
Figure 6C:
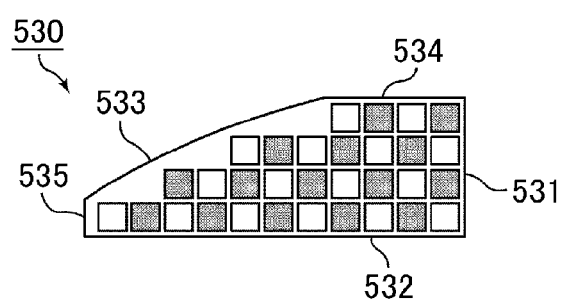
Figure 6D:
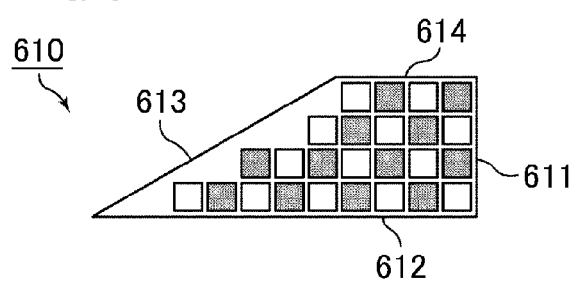
Figure 6E:
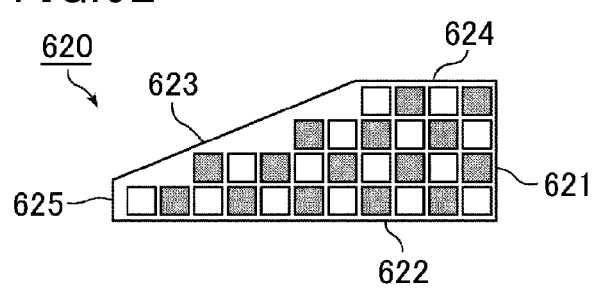

FIG. 6A, FIG. 6B, and FIG. 6C each illustrate a unit with a substantially fan-shaped cross section. FIG. 6D and FIG. 6E each illustrate a unit with a substantially trapezoidal cross section.

The respective units with a substantially fan-shaped cross section and the respective units with a substantially trapezoidal cross section illustrated in the figures include cells that have a substantially square shape in the cross section perpendicular to the longitudinal direction.

In the unit with a substantially fan-shaped cross section as the second-shaped unit, examples of the shape in the cross section perpendicular to the longitudinal direction include: a shape formed by one substantially circular arc and two straight line portions; a shape formed by one substantially circular arc and three straight line portions; a shape formed by one substantially circular arc and four straight line portions, and the like. The number of the substantially circular arc may be two or more, and the number of the straight line portions may be five or more, provided that the shape of the unit with a substantially fan-shaped cross section as the second-shaped unit in the cross section perpendicular to the longitudinal direction at least has one substantially circular arc and two straight line portions.

FIG. 6A illustrates one example of a unit with a substantially fan-shaped cross section as the second-shaped unit, whose shape in the cross section perpendicular to the longitudinal direction is formed by one substantially circular arc and two straight line portions. In a unit with a substantially fan-shaped cross section 510 illustrated in FIG. 6A, the shape in the cross section perpendicular to the longitudinal direction has a first side 511, a second side 512, and an inclined side 513.

The angle made by the first side 511 and the second side 512 is a substantially right angle, and the inclined side 513 faces the substantially right angle. The inclined side 513 is a substantially circular arc.

The inclined side 513 is connected to the first side 511 and the second side 512.

FIG. 6B illustrates one example of a unit with a substantially fan-shaped cross section as the second-shaped unit, whose shape in the cross section perpendicular to the longitudinal direction is formed by one substantially circular arc and three straight line portions. This unit with a substantially fan-shaped cross section has substantially the same shape as that of the second-shaped unit explained in the description of the honeycomb structure of the first embodiment of the present invention.

In a unit with a substantially fan-shaped cross section 520 illustrated in FIG. 6B, the shape in the cross section perpendicular to the longitudinal direction has a first side 521, a second side 522, an inclined side 523, and a third side 524.

The angle made by the first side 521 and the second side 522 is a substantially right angle, and the inclined side 523 faces the substantially right angle. The inclined side 523 is a substantially circular arc.

The third side 524 is a side that connects the inclined side 523 to the first side 521, and is substantially parallel to the second side 522.

FIG. 6C illustrates one example of a unit with a substantially fan-shaped cross section as the second-shaped unit, whose shape in the cross section perpendicular to the longitudinal direction is formed by one substantially circular arc and four straight line portions. In a unit with a substantially fan-shaped cross section 530 illustrated in FIG. 6C, the shape in the cross section perpendicular to the longitudinal direction has a first side 531, a second side 532, an inclined side 533, a third side 534, and a fourth side 535.

The angle made by the first side 531 and the second side 532 is a substantially right angle, and the inclined side 533 faces the substantially right angle. The inclined side 533 is a substantially circular arc.

The third side 534 is a side that connects the inclined side 533 to the first side 531, and is substantially parallel to the second side 532.

The fourth side 535 is a side that connects the inclined side 533 to the second side 532, and is substantially parallel to the first side 531.

In the unit with a substantially trapezoidal cross section as the second-shaped unit, examples of the shape in the cross section perpendicular to the longitudinal direction include: a shape formed by four straight line portions; a shape formed by five straight line portions, and the like.

In the shape of the unit with a substantially trapezoidal cross section, the number of the inclined side may be two or more, and the number of the straight line portion may be six or more, provided that the straight line portions at least include one inclined side and two other sides (first and second sides). Here, the cross-sectional shape of the "unit with a substantially trapezoidal cross section" is not limited to a substantially trapezoidal shape, and may be a substantially polygonal shape such as a substantially pentagonal or substantially hexagonal shape.

FIG. 6D illustrates one example of a unit with a substantially trapezoidal cross section as the second-shaped unit, whose shape in the cross section perpendicular to the longitudinal direction is formed by four straight line portions. In a unit with a substantially trapezoidal cross section 610 illustrated in FIG. 6D, the shape in the cross section perpendicular to the longitudinal direction has a first side 611, a second side 612, an inclined side 613, and a third side 614.

The angle made by the first side 611 and the second side 612 is a substantially right angle, and the inclined side 613 faces the substantially right angle. The inclined side 613 is a straight line.

The third side 614 is a side that connects the inclined side 613 to the first side 611, and is substantially parallel to the second side 612.

FIG. 6E illustrates one example of a unit with a substantially trapezoidal cross section as the second-shaped unit, whose shape in the cross section perpendicular to the longitudinal direction is formed by five straight line portions. In a unit with a substantially trapezoidal cross section 620 illustrated in FIG. 6E, the shape in the cross section perpendicular to the longitudinal direction has a first side 621, a second side 622, an inclined side 623, a third side 624, and a fourth side 625.

The angle made by the first side 621 and the second side 622 is a substantially right angle. The inclined side 623 faces the substantially right angle. The inclined side 623 is a straight line.

The third side 624 is a side that connects the inclined side 623 to the first side 621, and is substantially parallel to the second side 622.

The fourth side 625 is a side that connects the inclined side 623 to the second side 622, and is substantially parallel to the first side 621.

Embodiments of the cells in the respective honeycomb fired bodies are not limited to those mentioned in the above-mentioned embodiments of the present invention.

FIG. 7A, FIG. 7B, FIG. 7C, FIG. 7D, and FIG. 7E are side views each schematically illustrating one example of an end face of the first-shaped unit according to the honeycomb structure according to the embodiment of the present invention.

The honeycomb fired bodies illustrated in these figures each include large-capacity cells whose cross section perpendicular to the longitudinal direction has a relatively large area and small-capacity cells whose cross section perpendicular to the longitudinal direction has a relatively small area, the large-capacity cells and the small-capacity cells being alternately disposed.

Hereinafter, other embodiments of the cross-sectional shape of the cells of the honeycomb fired bodies are mentioned with reference to these figures.

Figure 7A:
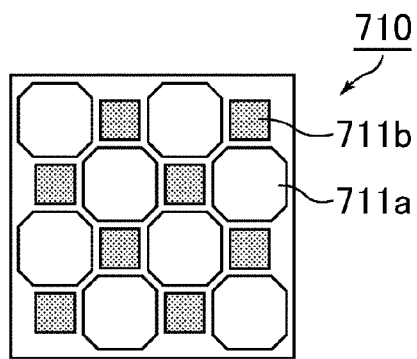
FIG. 7A, FIG. 7B, FIG. 7C, FIG. 7D, and FIG. 7E are side views each schematically illustrating one example of an end face of the first-shaped unit according to the honeycomb structure according to the embodiment of the present invention.

In a honeycomb fired body 710 illustrated in FIG. 7A, large-capacity cells 711a and small-capacity cells 711b are alternately disposed.

The cross section of the large-capacity cells 711a perpendicular to the longitudinal direction has an substantially octagonal shape. The cross section of the small-capacity cells 711b perpendicular to the longitudinal direction has a substantially quadrangular shape.

Here, the cross section of the small-capacity cells 711b perpendicular to the longitudinal direction may have a shape in which at least one portion equivalent to a corner of the substantially quadrangle has a substantially circular-arc shape.

Figure 7B:
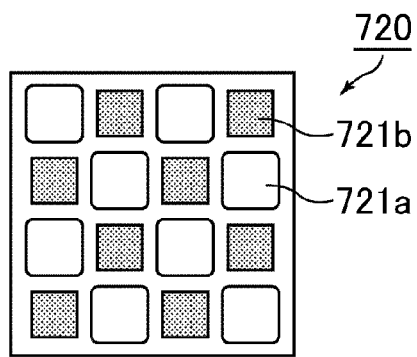

The honeycomb fired body 720 illustrated in FIG. 7B includes large-capacity cells 721a and small-capacity cells 721b alternately disposed.

The cross section of the large-capacity cells 721a perpendicular to the longitudinal direction has a substantially quadrangular shape in which portions equivalent to the corners have a substantially circular-arc shape. The cross section of the small-capacity cells 721b perpendicular to the longitudinal direction has a substantially quadrangular shape.

Figure 7C:
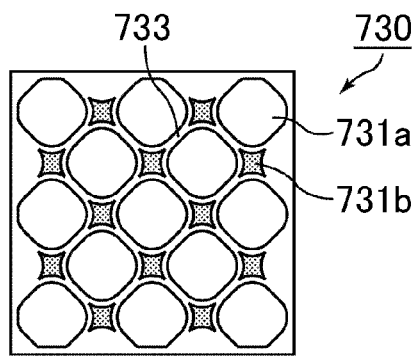

A honeycomb fired body 730 illustrated in FIG. 7C includes large-capacity cells 731a and small-capacity cells 731b alternately disposed.

The large-capacity cells 731a and the small-capacity cells 731b have a cross section perpendicular to the longitudinal direction in which each side of the cells is formed by a curved line.

Specifically, in FIG. 7C, the cross-sectional shape of a cell wall 733 is a curved shape.

In the shape of the cross section of the large-capacity cells 731a, the cell wall 733 is convex from the center to the outside of the cross section of the cell.

Whereas, in the shape of the cross section of the small-capacity cells 731b, the cell wall 733 is convex from the outside to the center of the cross section of the cell.

The cell wall 733 has a wave shape that rises and falls in the horizontal and vertical directions of the cross section of the honeycomb fired body. Mountain portions (portions that exhibits the maximum amplitude in the sine curve) of the wave shape of the adjacent cell walls 733 make their closest approach to one another, whereby large-capacity cells 731a whose cross section is dented outward and small-capacity cells 731b whose cross section is dented inward are formed. The amplitude of the wave shape may be substantially constant or variable, but preferably is substantially constant.

Figure 7D:
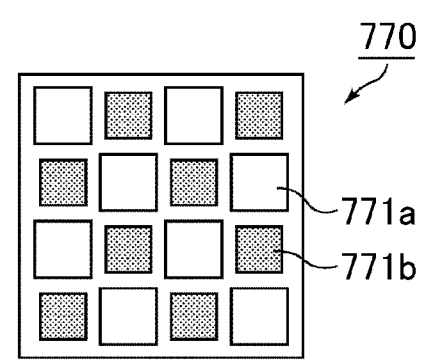

A honeycomb fired body 770 illustrated in FIG. 7D includes large-capacity cells 771a and small capacity cells 771b alternately disposed.

In the honeycomb fired body 770 illustrated in FIG. 7D, the cross section of each of the large-capacity cells 771a perpendicular to the longitudinal direction has a substantially quadrangular shape, and the cross section of each of the small-capacity cells 771b perpendicular to the longitudinal direction has a substantially quadrangular shape.

Figure 7E:
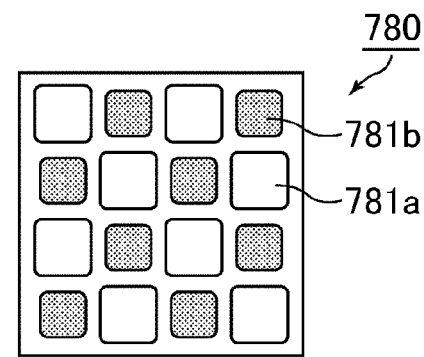
Figure 8A:
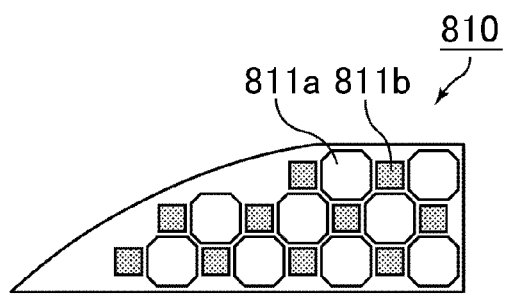
FIG. 8A, FIG. 8B, FIG. 8C, FIG. 8D, and FIG. 8E are side views each schematically illustrating one example of an end face of the second-shaped unit according to the honeycomb structure according to the embodiment of the present invention.
Figure 8D:
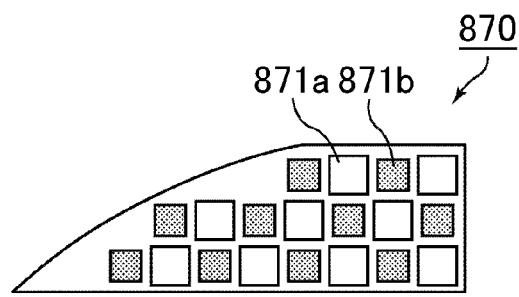
Figure 8B:
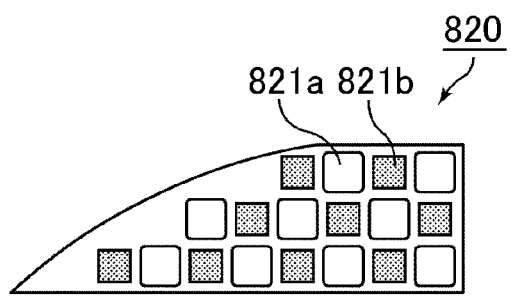
Figure 8E:
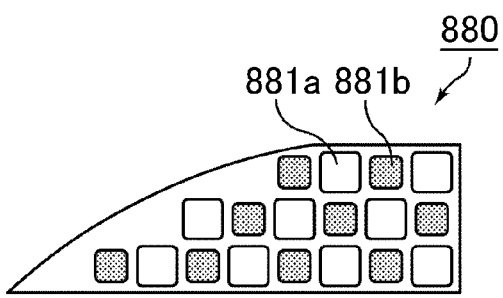
Figure 8C:
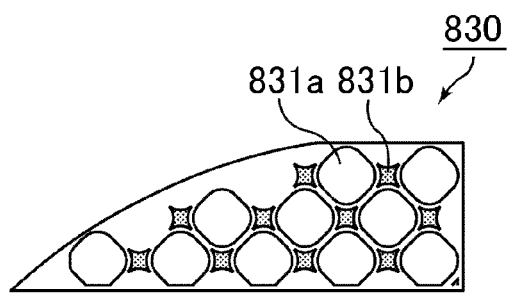
Figure 9A:
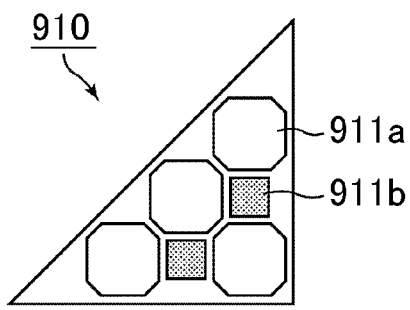
FIG. 9A, FIG. 9B, FIG. 9C, FIG. 9D, and FIG. 9E are side views each schematically illustrating one example of an end face of the third-shaped unit according to the honeycomb structure according to the embodiment of the present invention.
Figure 9D:
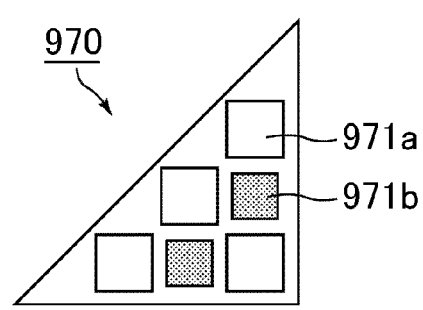
Figure 9B:
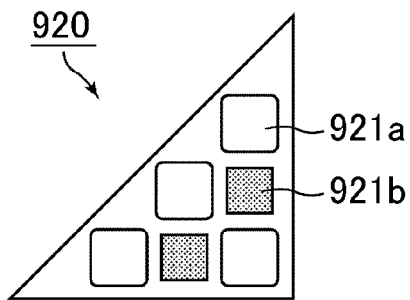
Figure 9E:
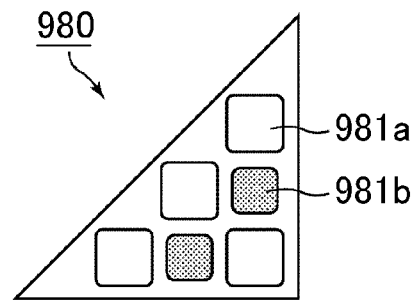
Figure 9C:
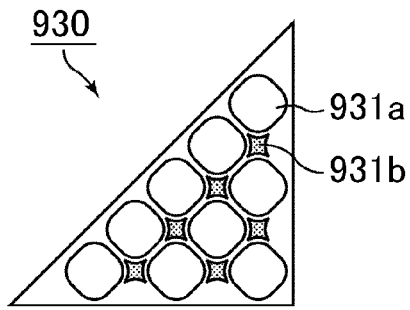

A honeycomb fired body 780 illustrated in FIG. 7E includes large-capacity cells 781a and small-capacity cells 781b alternately disposed.

In the honeycomb fired body 780 illustrated in FIG. 7E, the cross section of the large-capacity cells 781a perpendicular to the longitudinal direction has a shape in which portions equivalent to corners of the substantially quadrangular shape have a substantially circular-arc shape, and the cross section of the small-capacity cells 781b perpendicular to the longitudinal direction has a shape in which portions equivalent to corners of the substantially quadrangular shape have a substantially circular-arc shape.

Here, the large-capacity cells and the small-capacity cells may have a shape other than the above-mentioned shapes.

When the honeycomb fired bodies include the large-capacity cells and the small-capacity cells, a distance between centers of gravity of adjacently located large-capacity cells in the cross section perpendicular to the longitudinal direction is desirably substantially equal to a distance between centers of gravity of adjacently located small-capacity cells in the cross section perpendicular to the longitudinal direction.

The "distance between centers of gravity of adjacently located large-capacity cells in the cross section perpendicular to the longitudinal direction" means the minimum distance between a center of gravity of a large-capacity cell in the cross section perpendicular to the longitudinal direction and a center of gravity of an adjacent large-capacity cell in the cross section perpendicular to the longitudinal direction. On the other hand, the "distance between centers of gravity of adjacently located small-capacity cells in the cross section perpendicular to the longitudinal direction" means the minimum distance between a center of gravity of a small-capacity cell in the cross section perpendicular to the longitudinal direction and a center of gravity of an adjacent small-capacity cell in the cross section perpendicular to the longitudinal direction.

When the two distances between centers of gravity are substantially equal to each other, heat diffuses homogeneously upon regeneration of a honeycomb structure, whereby a local dispersion of temperature tends to disappear in the honeycomb structure. Hence, such a honeycomb structure being excellent in durability, i.e. where cracks and the like is less likely to appear due to a thermal stress even if it is repeatedly used for a long period of time, is obtained.

The case where the cells in the honeycomb fired body are composed of the large-capacity cells and the small-capacity cells is mentioned above with the first-shaped unit taken as an example, but the second- or third-shaped units may include a large-capacity cell and a small-capacity cell.

FIG. 8A, FIG. 8B, FIG. 8C, FIG. 8D, and FIG. 8E are side views each schematically illustrating one example of an end face of the second-shaped unit in accordance with the honeycomb structure according to the embodiment of the present invention.

Second-shaped units 810, 820, 830, 870, and 880 illustrated in these figures include large-capacity cells 811a, 821a, 831a, 871a, and 881a, and small-capacity cells 811b, 821b, 831b, 871b, and 881b, respectively. The respective large-capacity cells 811a, 821a, 831a, 871a, and 881a, and the respective small-capacity cells 811b, 821b, 831b, 871b, and 881b, are alternately disposed.

The shapes of the large-capacity cells and the small-capacity cells are substantially the same as in the first-shaped unit, and therefore the detail description thereof is omitted.

FIG. 9A, FIG. 9B, FIG. 9C, FIG. 9D, and FIG. 9E are side views each schematically illustrating one example of an end face of the third-shaped unit in accordance with the honeycomb structure according to the embodiment of the present invention.

Third-shaped units 910, 920, 930, 970, and 980 illustrated in these figures include large-capacity cells 911a, 921a, 931a, 971a, and 981a, and small-capacity cells 911b, 921b, 931b, 971b, and 981b, respectively. The respective large-capacity cells 911a, 921a, 931a, 971a, and 981a, and the respective small-capacity cells 911b, 921b, 931b, 971b, and 981b, are alternately disposed.

The shapes of the large-capacity cells and the small-capacity cells are substantially the same as in the first-shaped unit mentioned above, and therefore the detail description thereof is omitted.

The second-shaped units are not limited to the one illustrated in FIG. 3 in the above first embodiment of the present invention or those illustrated in FIG. 6A, FIG. 6B, FIG. 6C, FIG. 6D, and FIG. 6E.

Figure 10:
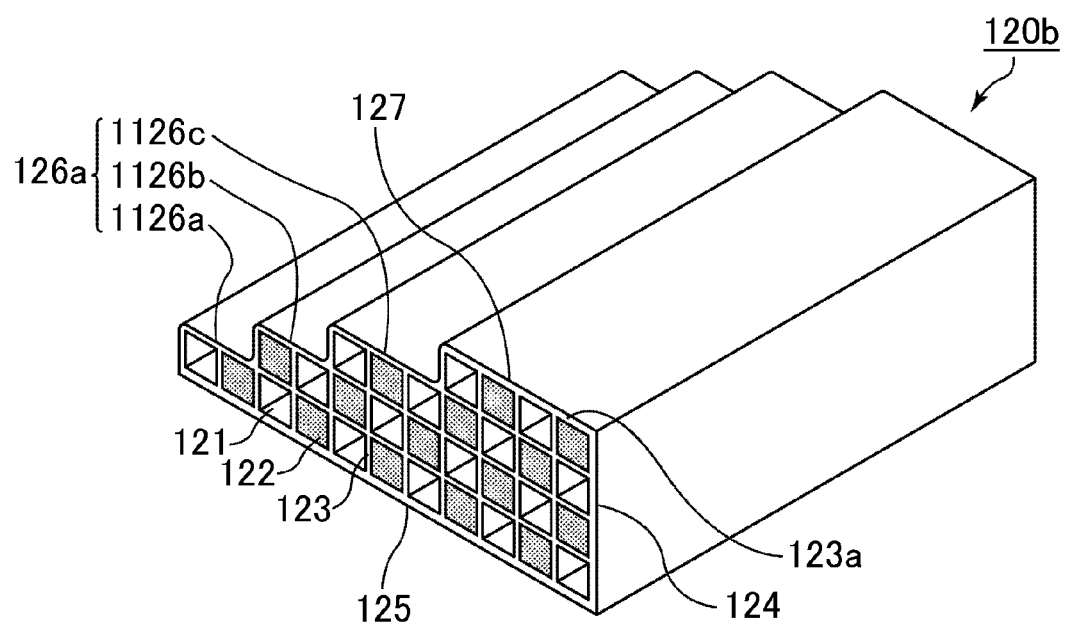
FIG. 10 is a perspective view schematically illustrating one example of the second-shaped unit according to the honeycomb structure according to the embodiment of the present invention.

FIG. 10 is a perspective view schematically illustrating one example of the second-shaped unit according to the honeycomb structure according to the embodiment of the present invention.

As in the second-shaped unit 120b illustrated in FIG. 10, the inclined side 126a may be formed by a plurality of the cells 121 disposed in a substantially stair-shaped fashion with the cell wall 123 therebetween in the cross section perpendicular to the longitudinal direction. FIG. 10 illustrates one example of the second-shaped unit where a side 1126a, a side 1126b, and a side 1126c form the inclined side 126a.

When the inclined side 126a in such a configuration is applied to the second-shaped unit, the thickness d2 of the sealing material layer is a thickness of the sealing material layer at half (middle of) the total length of the side 1126a, the side 1126b, and the side 1126c in the direction perpendicular to the side at the halfway point.

The shape of the honeycomb structure according to the embodiment of the present invention is not especially limited to a substantially round pillar shape, and may have any desired pillar shape such as a pillar shape with a substantially racetrack end face, or a substantially cylindroid shape, or a pillar shape with a substantially triangular end face whose apexes have a curved shape, and a substantially polygonal pillar shape.

The porosity of the honeycomb fired body is not particularly limited, and is desirably about 35% to about 60%.

When the honeycomb structure that is configured by the honeycomb fired bodies is used as a filter, a porosity of the honeycomb fired body of about 35% or more is less likely to cause clogging in the honeycomb fired body, while a porosity of the honeycomb fired body of about 60% or less is less likely to cause a decrease in strength of the honeycomb fired body with the result that the honeycomb fired body is less likely to be broken.

The average pore diameter of the honeycomb fired body is desirably about 5 μm to about 30 μm.

When the honeycomb structure that is configured by the honeycomb fired bodies is used as a filter, an average pore diameter of the honeycomb fired body of about 5 μm or more is less likely to cause clogging of particulates. On the other hand, the honeycomb fired body with an average pore diameter of about 30 μm or less is less likely to allow particulates to pass through the pores, and as a result, it tends to sufficiently function as a filter.

Here, the above-mentioned porosity and pore diameter can be measured through known methods such as a measuring method using a mercury porosimeter.

The cell wall thickness of the honeycomb fired body is not particularly limited, and desirably is about 0.1 mm to about 0.4 mm.

If the thickness of the cell wall is about 0.1 mm or more, the cell wall is less likely to be thin, which makes it easier to maintain the strength of the honeycomb fired body; whereas a thickness of the cell wall of about 0.4 mm or less is less likely to increase pressure loss of the honeycomb fired body.

The cell density in the cross section perpendicular to the longitudinal direction of the honeycomb fired body is not particularly limited. A desirable lower limit is about 31 pcs/cm$^2$ (about 200 pcs/in$^2$) and a desirable upper limit is about 93 pcs/cm$^2$ (about 600 pcs/in$^2$). A more desirable lower limit is about 38.8 pcs/cm$^2$ (about 250 pcs/in$^2$) and a more desirable upper limit is about 77.5 pcs/cm$^2$ (about 500 pcs/in$^2$).

The proportion of the area occupied by the units (the honeycomb fired bodies) in the cross section perpendicular to the longitudinal direction of the honeycomb structure, i.e. the occupancy of the honeycomb fired bodies, is desirably about 85% or more, and more desirably about 88% or more. As the occupancy of the honeycomb fired bodies in the honeycomb structure body becomes higher, the filtration area increases, and thus, the purifying performance for exhaust gases is likely to be enhanced.

The main component of the constitution material of the honeycomb fired body is not limited to silicon carbide, and may be the following ceramics: nitride ceramics such as aluminum nitride, silicon nitride, boron nitride, and titanium nitride; carbide ceramics such as zirconium carbide, titanium carbide, tantalum carbide, and tungsten carbide; oxide ceramics such as alumina, zirconia, cordierite, mulite, aluminum titanate; and the like.

Among these components, non-oxide ceramics are preferable, and silicon carbide is particularly preferable. This is because they are excellent in thermal resistance, mechanical strength, thermal conductivity and the like. Moreover, silicon-containing silicon carbide in which silicon carbide is blended with metallic silicon is preferably used for the same reason.

A catalyst may be supported on the honeycomb structure according to the embodiment of the present invention.

When a catalyst capable of converting harmful gaseous components such as CO, HC, and NOx in an exhaust gas is supported on the honeycomb structure, the harmful gaseous components in the exhaust gas can be converted sufficiently by catalytic reaction. Moreover, when a catalyst for assisting combustion of PMs is supported on the honeycomb structure, the PMs can be more easily burned and removed.

The honeycomb structure (honeycomb filter) with cells sealed at either one end thereof is mentioned as the honeycomb structure; however, in the honeycomb structure according to the embodiment of the present invention, the cells are not necessarily sealed at an end thereof. This honeycomb structure according to the embodiment of the present invention can be suitably used as a catalyst supporting carrier.

In the method for manufacturing the honeycomb structure according to the embodiment of the present invention, the method for manufacturing the ceramic block by disposing the honeycomb fired bodies at predetermined positions is not especially limited. The following method can be employed, for example.

Firstly, a plurality of honeycomb fired bodies are placed in parallel with one another in columns and rows, with a spacer interposed therebetween, thereby manufacturing a parallel-arranged body of the honeycomb fired bodies whose cross section perpendicular to the longitudinal direction thereof has substantially the same shape as that of a ceramic block to be manufactured. In this case, a gap corresponding to the thickness of the spacer is formed between the honeycomb fired bodies.

Successively, the parallel-arranged body of the honeycomb fired bodies is placed inside a filling apparatus including a tubiform with a substantially cylindrical shape and the like, and the gap formed between the honeycomb fired bodies and the gap formed between the parallel-arranged body and the tubiform are filled with a sealing material paste.

The filling apparatus is provided with the tubiform having a substantially cylindrical shape and the like and a sealing material paste supply device. The tubiform has an inner diameter slightly larger than the diameter of the parallel-arranged body of the honeycomb fired bodies to be disposed therein-side, and is so configured that a gap is formed between the tubiform and the parallel-arranged body of the honeycomb fired bodies when the parallel-arranged body is disposed in the inner space of the tubiform.

The sealing material paste supply device is so configured to allow simultaneously filling a space between the honeycomb fired bodies and a space between the tubiform and the parallel-arranged body with a sealing material paste accommodated in a sealing material paste container.

With the parallel-arranged body of the honeycomb fired bodies and the filling apparatus, the sealing material paste is filled into the space between the honeycomb fired bodies and the space between the tubiform and the parallel-arranged body. Successively, the sealing material paste is dried and solidified to simultaneously form an adhesive layer between the honeycomb fired bodies and a sealing material layer (coat layer).

Specifically, the above-mentioned method is a method including simultaneously carrying out combining in which a ceramic block is manufactured and forming sealing material layer in which a sealing material layer is formed on the peripheral face of the ceramic block.

Further, in the method for manufacturing the honeycomb structure according to the embodiment of the present invention, for example, the following method may be employed as the method for manufacturing a ceramic block by disposing the honeycomb fired bodies at predetermined positions.

The following description will discuss a method for manufacturing a ceramic block by exemplifying the case of manufacturing the ceramic block illustrated in FIG. 5A.

Firstly, an adhesive paste is applied to the side surface of the first-shaped unit 110 to form an adhesive paste layer. Then, another first-shaped unit 110 is piled up on this adhesive paste layer and this operation is repeated, thereby attaching 9 pieces of the first-shaped units 110 to one another. Thus, an aggregated body of the first-shaped units 110 is manufactured which has a square shape in the cross section perpendicular to the longitudinal direction. Next, the first-shaped units are further disposed on the left, right, top, and bottom sides of this aggregated body to manufacture a substantially cross-shaped aggregated body of the first-shaped units.

Next, an adhesive paste is applied to a recessed portion of the aggregated body of the first-shaped units 110 in FIG. 5A, thereby forming an adhesive paste layer.

Then, the third-shaped units 130 are each fitted into the periphery of the first-shaped units 110 (the peripheral first-shaped unit and the outermost first-shaped unit) so that the first side 134 and the second side 135 of the third-shaped unit 130 are adjacent to the first-shaped units 110 (the peripheral first-shaped unit and the outermost first-shaped unit), respectively, with the adhesive paste layer therebetween.

Successively, an adhesive paste is applied to a portion where the hypotenuse 136 of the third-shaped unit 130 is disposed in FIG. 5A, thereby forming an adhesive paste layer.

Then, the second-shaped units 120 are each fitted into the periphery of the third-shaped units 130 so that the hypotenuse 136 of the third-shaped unit faces the second side 125 of the second-shaped unit 120 with the adhesive layer therebetween.

In this case, an adhesive paste is applied also to the first sides of the adjacent two second-shaped units 120, thereby forming an adhesive paste layer.

Thus, a ceramic block with a cross-sectional shape illustrated in FIG. 5A is manufactured in which 13 pieces of the first-shaped units 110, 8 pieces of the second-shaped units 120, and 8 pieces of the third-shaped units 130 are combined with one another with the adhesive paste layer interposed therebetween.

Successively, forming sealing material layer is carried out in which a sealing material paste is applied to the peripheral face of the ceramic block, and then dried and solidified to form a sealing material layer (coat layer) to manufacture a substantially round pillar-shaped honeycomb structure.

Specifically, the above-mentioned method is a method including independently carrying out combining in which a ceramic block is manufactured and forming sealing material layer in which a sealing material layer is formed on the peripheral face of the ceramic block.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A honeycomb structure comprising:
    a ceramic block comprising:
        a plurality of honeycomb fired bodies each having cell walls extending along a longitudinal direction of said plurality of honeycomb fired bodies to define cells, said plurality of honeycomb fired bodies comprising:
            first-shaped units each having a substantially quadrangular shape in a cross section perpendicular to the longitudinal direction;
            second-shaped units each having a shape that includes at least a first side, a second side longer than said first side and making a substantially right angle with said first side, and an inclined side facing said substantially right angle in the cross section perpendicular to the longitudinal direction, each of said second-shaped units being disposed in a peripheral portion of said ceramic block in such a manner that said inclined side is in contact with a sealing material layer;
            third-shaped units each having a substantially right triangular shape with a hypotenuse and adjacent sides in the cross section perpendicular to the longitudinal direction, each of said third-shaped units being disposed on an inner side of said second-shaped units in said ceramic block in such a manner that the hypotenuse faces said second side of one of said second-shaped units with an adhesive layer between the hypotenuse and said second side; and
            said first-shaped units including peripheral first-shaped units, each of said peripheral first-shaped units being disposed in such a manner as to have two sides, one side of said two sides facing one of the adjacent sides of one third-shaped unit among the third-shaped units with said adhesive layer between the one side of said two sides and the one of the adjacent sides, another side of said two sides facing one of the adjacent sides of another third-shaped unit among the third-shaped units with the adhesive layer between the another side of said two sides and the one of the adjacent sides, said two sides of each of said peripheral first-shaped units or extensions of said two sides being each neither substantially parallel nor substantially perpendicular to an extension of said second side and an extension of said first side of each of said second-shaped units; and
            the adhesive layer being interposed between said plurality of honeycomb fired bodies to combine said plurality of honeycomb fired bodies; and
        the sealing material layer being provided on a peripheral face of said ceramic block.

2. The honeycomb structure according to claim 1, wherein
said peripheral first-shaped units include outermost first-shaped units that are disposed in the peripheral portion of said ceramic block,
each of said outermost first-shaped units has a side that is in contact with said sealing material layer, and
said sealing material layer has a thickness in a portion that is in contact with each of said outermost first-shaped units larger than a thickness in a portion that is in contact with said inclined side of each of said second-shaped units.

3. The honeycomb structure according to claim 1, wherein
said inclined side of each of said second-shaped units is formed by the cells disposed in a substantially stair-shaped fashion with the cell walls between the cells in the cross section perpendicular to the longitudinal direction.

4. The honeycomb structure according to claim 1, wherein
a number of said plurality of honeycomb fired bodies is 25 or more.

5. The honeycomb structure according to claim 1, wherein
said honeycomb structure has a substantially circular shape in the cross section perpendicular to said longitudinal direction and has a diameter of about 190 mm or more.

6. The honeycomb structure according to claim 1, wherein
said cells have a substantially quadrangular shape in the cross section perpendicular to said longitudinal direction.

7. The honeycomb structure according to claim 1, wherein
said cells comprise a large-capacity cell and a small-capacity cell.

8. The honeycomb structure according to claim 7, wherein
said large-capacity cell and said small-capacity cell have, in the cross section perpendicular to said longitudinal direction, a substantially quadrangular shape or a substantially quadrangular shape in which at least one on equivalent to a corner of a quadrangle has a substantially circular-arc shape.

9. The honeycomb structure according to claim 7, wherein
said large-capacity cell has a substantially octagonal shape in the cross section perpendicular to said longitudinal direction, and
said small-capacity cell has, in the cross section perpendicular to said longitudinal direction, a substantially quadrangular shape or a substantially quadrangular shape in which at least one portion equivalent to a corner of a quadrangle has a substantially circular-arc shape.

10. The honeycomb structure according to claim 7, wherein
said large-capacity cell and said small-capacity cell have a cross section perpendicular to the longitudinal direction in which each side of said large-capacity cell and said small-capacity cell is formed by a curved line.

11. The honeycomb structure according to claim 1, wherein
each of said cells has a first end portion and a second end portion opposite to the first end portion in the longitudinal direction, and
each of said cells is sealed at one of the first end portion and the second end portion.

12. The honeycomb structure according to claim 1, wherein
said two sides of each of said peripheral first-shaped units or extensions of said two sides each make an angle of about 45 with said first side and said second side of each of said second-shaped units.

13. The honeycomb structure according to claim 1, wherein
each of said first-shaped units has a substantially square shape in the cross section perpendicular to the longitudinal direction,
each of said second-shaped units has a substantially fan shape in the cross section perpendicular to the longitudinal direction, and
each of said third-shaped units has an substantially isosceles right triangular shape in the cross section perpendicular to the longitudinal direction.

14. The honeycomb structure according to claim 13, wherein
9 pieces of said first-shaped units are disposed to form a substantially square shape,
said first-shaped units are further disposed on left, right, top, and bottom sides of the square shape to construct a substantially cross-shaped aggregated body of said first-shaped units,
each of said third-shaped units is disposed in such a manner that a substantially right angle portion of each of said third-shaped units is fitted into a recessed portion of the aggregated body of said first-shaped units, and
each of said second-shaped units is disposed in such a manner that the second side of each of said second-shaped units faces the hypotenuse of each of said third-shaped units.

15. The honeycomb structure according to claim 1, wherein
a total number of said plurality of honeycomb fired bodies is 29 pieces, and
of the total number, 13 pieces are said first-shaped units, 8 pieces are said second-shaped units, and 8 pieces are said third-shaped units.

16. The honeycomb structure according to claim 1, wherein
a cell wall thickness of each of said cells is about 0.1 mm to about 0.4 mm.

17. The honeycomb structure according to claim 1, wherein
a proportion of an area occupied by said first-shaped units, said second-shaped units, and said third-shaped units in the cross section perpendicular to the longitudinal direction of said honeycomb structure is about 85% or more.

18. The honeycomb structure according to claim 17, wherein
the proportion of the area occupied by said first-shaped units, said second-shaped units, and said third-shaped units in the cross section perpendicular to the longitudinal direction of said honeycomb structure is about 88% or more.

19. The honeycomb structure according to claim 1, wherein
a main component of said plurality of honeycomb fired bodies comprises silicon carbide or silicon-containing silicon carbide.

20. The honeycomb structure according to claim 1, wherein
a catalyst is supported on said honeycomb structure.

21. The honeycomb structure according to claim 1, wherein
each of said cells has a first end portion and a second end portion opposite to the first end portion in the longitudinal direction, and
each of said cells are not sealed at the first end portion and the second end portion.

* * * * *

UNITED STATES PATENT AND TRADEMARK OFFICE
CERTIFICATE OF CORRECTION

PATENT NO.         : 8,895,131 B2
APPLICATION NO.    : 13/089324
DATED              : November 25, 2014
INVENTOR(S)        : Seiji Tamura It is certified that error appears in the above-identified patent and that said Letters Patent is hereby corrected as shown below:

In the claims,

Column 24, line 42, "on" should be changed to --portion--.

Column 25, line 5, "45" should be changed to --45°--.

Signed and Sealed this
Twenty-eighth Day of April, 2015

Michelle K. Lee
*Director of the United States Patent and Trademark Office*